March 6, 1956  H. W. LORMOR  2,736,934

APPARATUS FOR MANUFACTURING STORAGE BATTERIES

Filed May 26, 1951  5 Sheets-Sheet 1

INVENTOR.
HENRY W. LORMOR
BY
ATTORNEYS

March 6, 1956 H. W. LORMOR 2,736,934
APPARATUS FOR MANUFACTURING STORAGE BATTERIES
Filed May 26, 1951 5 Sheets-Sheet 2

INVENTOR.
HENRY W. LORMOR
BY Hudson, Boughton,
Williams, David & Hoffmann.
ATTORNEYS March 6, 1956  H. W. LORMOR  2,736,934
APPARATUS FOR MANUFACTURING STORAGE BATTERIES
Filed May 26, 1951  5 Sheets-Sheet 3

INVENTOR.
HENRY W. LORMOR
BY Hudson, Boughton,
Williams, David & Hoffmann
ATTORNEYS March 6, 1956 H. W. LORMOR 2,736,934
APPARATUS FOR MANUFACTURING STORAGE BATTERIES
Filed May 26, 1951 5 Sheets-Sheet 4

INVENTOR.
HENRY W. LORMOR
BY Hudson, Doughton,
Williams, David & Hoffmann
ATTORNEYS March 6, 1956  H. W. LORMOR  2,736,934
APPARATUS FOR MANUFACTURING STORAGE BATTERIES
Filed May 26, 1951  5 Sheets-Sheet 5

INVENTOR.
HENRY W. LORMOR
BY Hudson, Boughton,
Williams, David & Hoffmann.
ATTORNEYS United States Patent Office 2,736,934
Patented Mar. 6, 1956

2,736,934

APPARATUS FOR MANUFACTURING STORAGE BATTERIES

Henry W. Lormor, Shaker Heights, Ohio, assignor to The Electric Storage Battery Company, a corporation of New Jersey Application May 26, 1951, Serial No. 228,516

2 Claims. (Cl. 22—58)

The present invention relates to a method and apparatus for manufacturing storage batteries and, more particularly, to a new and improved method and apparatus for casting plate connecting straps on groups of battery plates, as distinguished from forming individual connecting straps and subsequently burning them to the battery plate lugs.

The principal object of the present invention is the provision of a new and improved method and apparatus for casting plate connecting straps to groups of plates forming storage battery elements, whereby the straps are cast while the battery plates are in a vertical position with the lugs thereof at the top of the plate group and in a manner which assures sound connecting straps having the battery plate lugs homogeneous therewith.

A more specific object of the invention is the provision of a new and improved method of casting connecting plate straps each comprising a terminal post and foot section to storage battery plate groups which comprises placing a group of plates vertically with the lugs thereof uppermost, surrounding the lugs with a mold cavity to form the foot of the connecting strap, providing a post mold communicating with the foot cavity and having the post cavity extending above the foot cavity, introducing molten metal into the foot cavity through a gate having a molten metal receptacle extending to a height at least equal to the height of the post to be formed in the post mold.

Another object of the invention is the provision of a new and improved apparatus for casting plate connecting straps to vertically positioned battery plate groups, which apparatus includes a mold having a strap cavity and a casting gate which is movably supported relative to the mold, and which gate communicates with the mold cavity through one or more sprues having a relatively small diameter so that the gate can be moved relative to the mold to shear solidified metal in the sprues from the strap.

Another object of the invention is the provision of a new and improved apparatus for casting plate connecting straps to battery plate groups which includes a mold structure having a cavity for the strap foot and a terminal post cavity extending above the foot cavity, the foot cavity having an open bottom to receive the lugs of a group of battery plates therein, means for closing the bottom of the foot cavity when the plate lugs project into the cavity, and a gate movably supported relative to the mold structure and extending above the level of the top of the post cavity and having openings or sprues leading into the foot cavity.

A further object of the invention is the provision of an apparatus of the character described in which the diameter of the openings or sprues leading into the foot mold are relatively small and the gate is movable in a horizontal plane whereby solidified metal in the sprues can be sheared from the foot top by moving the gate.

Still another object of the invention is the provision of an apparatus of the character referred to in which the mold structure has a cylindrical member forming the post cavity and which member provides a pivot structure for the gate.

The invention resides in certain steps of process, constructions and combinations and arrangements of parts, and further objects and advantages will be apparent to those skilled in the art to which it relates from the following description of the preferred embodiment described with reference to the accompanying drawings forming a part of the specification, in which, Fig. 1 is a side elevational view of apparatus for casting plate connecting straps on storage battery elements in accordance with the present invention, certain parts of which apparatus are broken away;

As is well known in the art, storage battery elements comprise a group of positive and a group of negative plates arranged with the plates thereof interleaved and having a suitable separator interposed between the adjacent positive and negative plates. Each plate has a lug thereon and the plate lugs of each group are interconnected by a plate connecting strap which comprises a terminal post having a so-called foot integral therewith and the foot is preferably fused to the plate lugs. The present invention contemplates a method and apparatus by which the plate connecting straps can be cast on the battery plates while the plates are assembled in the form of an element and positioned with the plate lugs at the tops thereof.

Figure 10:
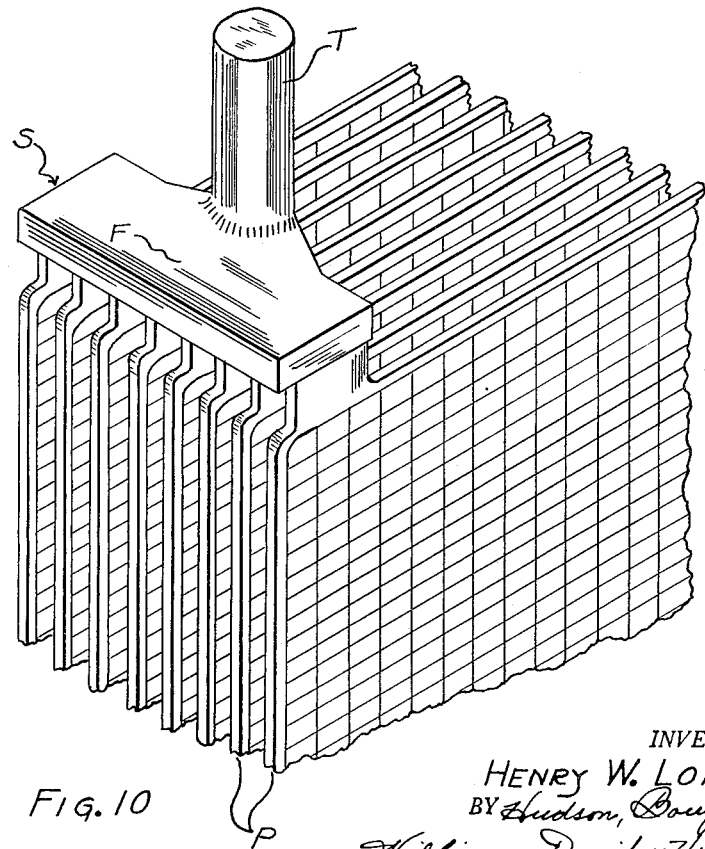
Fig. 10 is a fragmentary perspective view of a group of battery plates having a connecting strap cast thereon.

Referring to the drawings, the preferred form of the invention is shown comprising a mold apparatus 15 for casting plate connecting straps to groups of battery plates assembled in a battery element. Referring to Fig. 10, a group of plates P are shown having a connecting strap S cast thereon, which strap comprises a foot F, which interconnects the battery plates, and a terminal post T.

The apparatus 15 comprises a frame which includes a base plate 20 having two spaced upright side plates 22, 23 and a horizontal top or mold plate 24 bridging the two side plates. The plate 24 is arranged to move vertically from the tops of the side plates, as seen in broken lines in Fig. 4, and in the form shown the plate is guided vertically by two guide plates 26, 27 attached to opposite sides thereof, which guide plates extend alongside the side plates 22, 23 respectively, and slidably engage therewith. Each guide plate has flanges 28 along opposite sides which cooperate with the edges of plates 22, 23 to direct the guide plates vertically.

The plate 24 is raised and lowered by two pairs of toggle links, one pair at opposite sides of the uprights 22, 23 and each of which pair comprises links 30, 31 pivotally joined together at one end. The links 30 are pivotally connected at their outer ends to the guide plates 26, 27 respectively, and the lower ends of the links 31 are pivotally connected to brackets 32 attached to base plate 20. A pair of links 34 are connected at one end to the pivoted joints of the links 30 and 31 and the opposite ends are attached to the arms 36, 37 of a U-shape handle 35. The arms 36, 37 are interconnected at one end by a crossbar 38 and the opposite ends are pivotally connected to lugs 40 attached to the base plate 20. As may be seen in Fig. 4, when the handle 35 is moved to a vertical position, the toggle links 30, 31 are moved to a straight line relationship which elevates plate 24 from the tops of the side plates 22, 23 and when handle 35 is swung to the left, as viewed in Fig. 4, the toggle formed by links 30, 31 is broken and the links draw the plate 24 to the top edges of the side plates.

Plate 24 has a pair of openings 42, 43 therethrough adjacent to opposite sides of the plate to form the cavities for the foot portions of the connecting straps. The configurations of the openings therefore correspond to those desired for the feet of the connecting straps and the thickness of plate 24 is equal to that desired for the thickness of the feet of the connecting straps.

In the form shown, the inner sides of the openings 42, 43 have recessed portions, and hollow cylindrical mold members 45, 46 are welded, or otherwise suitably secured, to the plate 24 and project outwardly over the recessed portions of the openings 42, 43 respectively. The members 45, 46 each has a cylindrical bore 47 therein which is open at the bottom thereof and which terminates short of the top of the members to form the post cavity. Preferably the bores 47 taper toward the top thereof and vent openings 48 are formed connecting the upper ends of the bores with atmosphere.

The mold openings 42, 43 are located so that when the plate 24 is lowered against the tops of the side plates, the openings receive the lugs of positive and negative plates, respectively, of battery plates assembled in the form of an element between the side walls 22, 23. This is clearly shown in Figs. 5 and 6, wherein the positive plate lugs PL are shown in the opening or cavity 42, and the negative lugs NL are shown in cavity 43.

Figure 5:
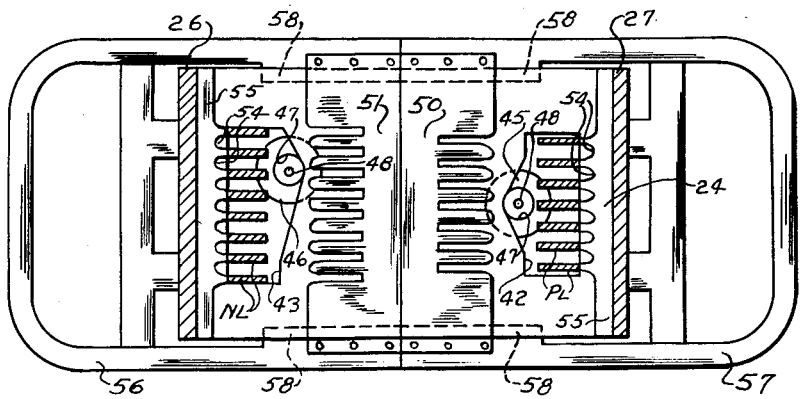
Figs. 5 and 6 are sectional views taken substantially along line 5—5 of Fig. 2 showing certain parts of the apparatus in two different positions.
Figure 6:
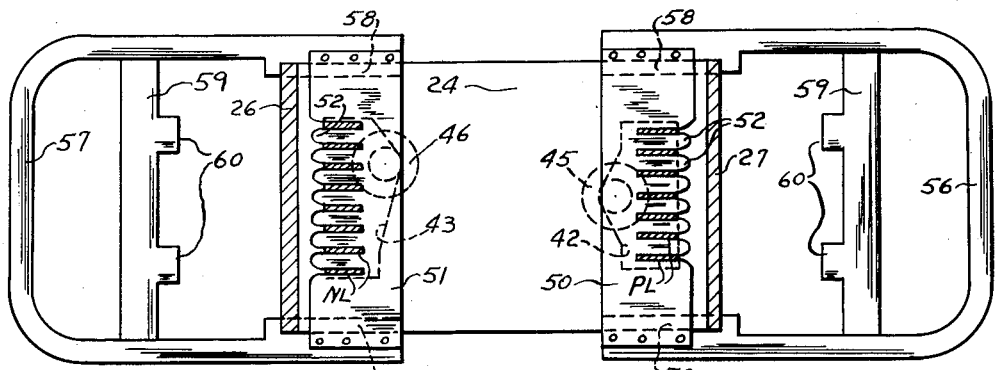
Figure 7:
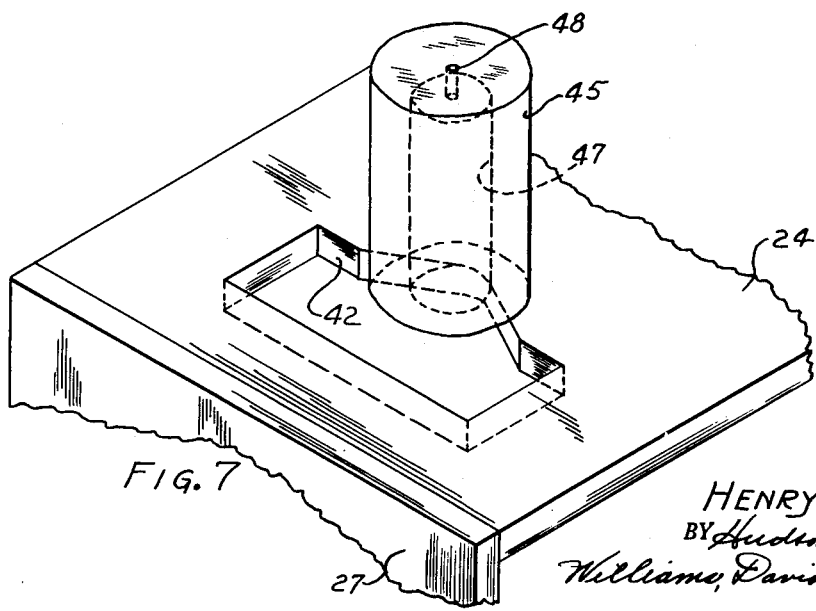
Fig. 7 is a fragmentary perspective view of a portion of the apparatus showing a mold cavity with the gate therefor removed.
Figure 9:
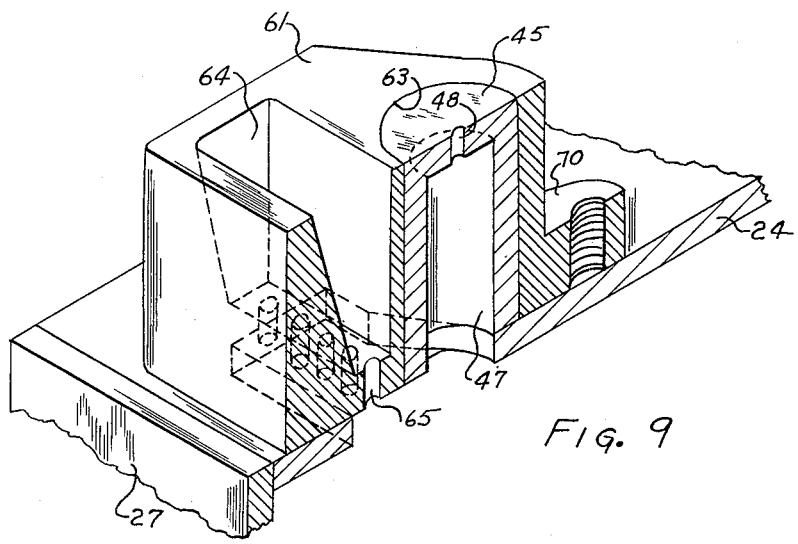
Fig. 9 is a sectional view taken substantially along line 9—9 of Fig. 8.

The bottoms of the openings or cavities 42, 43 are adapted to be closed when the plate lugs are extending therein by suitable means and in the form shown are closed by combs 50, 51 respectively. The combs each comprises a relatively thin metal plate which is slidingly supported against the bottom side of plate 24 and which has a plurality of fingers 52 which are spaced apart a distance equal to the thickness of the battery lugs so that the lugs are snugly embraced therein when the comb plates are moved to insert the fingers thereof between the lugs. Preferably, the fingers are slightly longer than the length of the lugs and the ends thereof are rounded and fit into correspondingly formed recesses 54, formed in embossed portions 55 in the underside of plate 24. The combs 50, 51 are slidable from the central portion of the plate 24 outwardly to engage in the recesses 54 by handles 56, 57 each of which comprises a U-shaped member having the outer end portions of the arms thereof undercut along inner edges as at 58 to engage the top and side edges of the plate 24 and provide guides for the handles to move along the plate. The comb plates 50, 51 are attached to the undersides of the handles 56, 57 respectively and slidingly engage the underside of plate 24. Preferably, the inward movement of the handles 56 is limited by stop bars 59 interconnecting the intermediate portions of the arms of the respective handles and which stop members have abutment lugs 60 which engage the guide plates 26, 27. It will be apparent that when the handles 56, 57 are moved inwardly of the plate 24, the comb plates 50, 51 are out of registration with the openings 42, 43, as seen in Fig. 5, and when the handles are moved outwardly the comb plates are moved across the bottoms of the openings, as seen in Fig. 6.

A pair of gates 61, 62 are pivotally supported on the upper side of plate 24 over the openings 42, 43 respectively, and each gate comprises a block of metal having a tubular bore 63 therethrough which receives the mold members 45, 46, respectively, to form a pivot about which the gates may be rotated in a horizontal plane. The gates each has a trough or hopper 64 which tapers toward the bottom thereof and a plurality of sprue openings 65 connect the trough 64 with the cavity formed by the respective openings 42, 43. The diameters of the sprues are relatively small so that metal solidified therein can be sheared by rotating the gates on their pivots without the use of excessive force.

Figure 1:
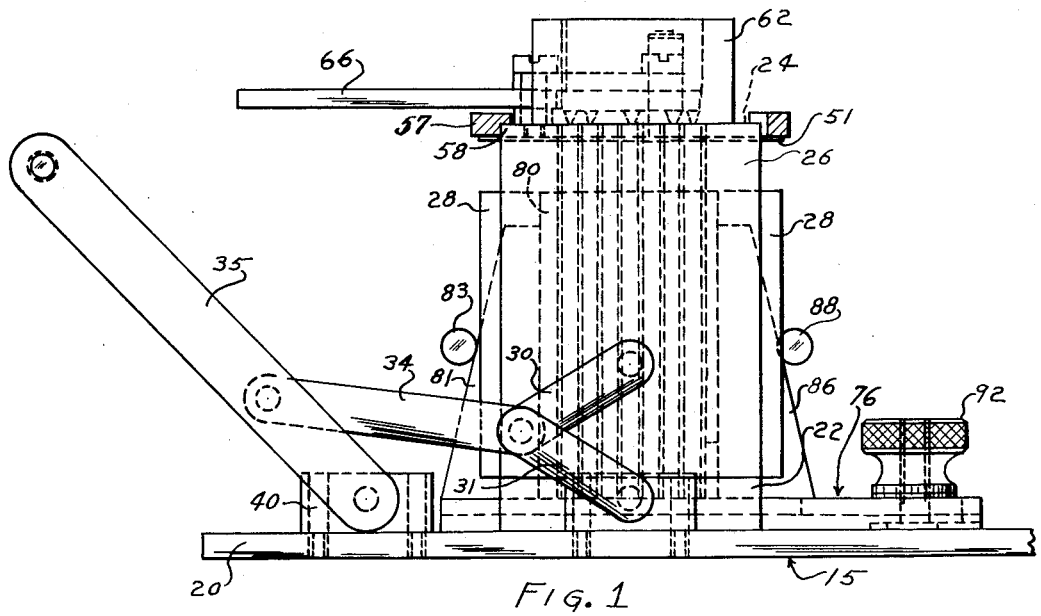
Figure 2:
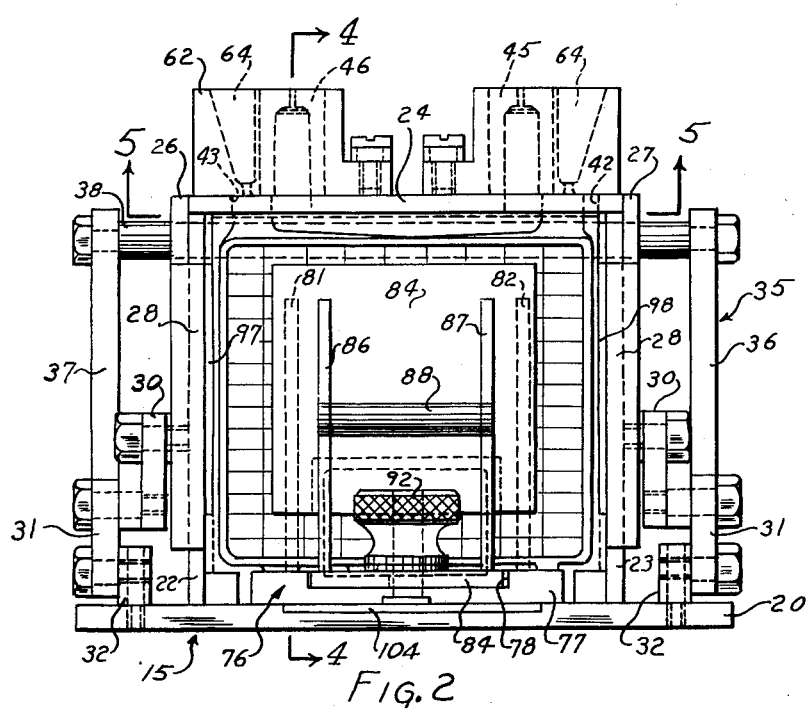
Fig. 2 is an end view of the apparatus shown in Fig. 1 but having certain parts omitted.
Figure 3:
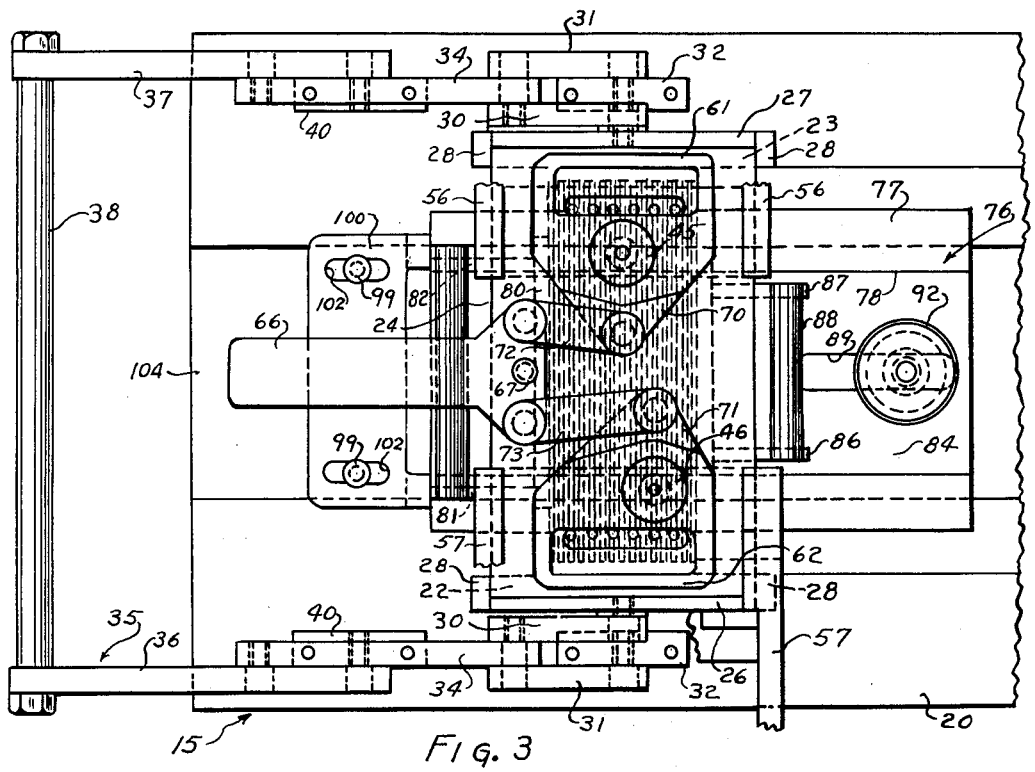
Fig. 3 is a fragmentary plan view of the apparatus shown in Fig. 1.
Figure 8:
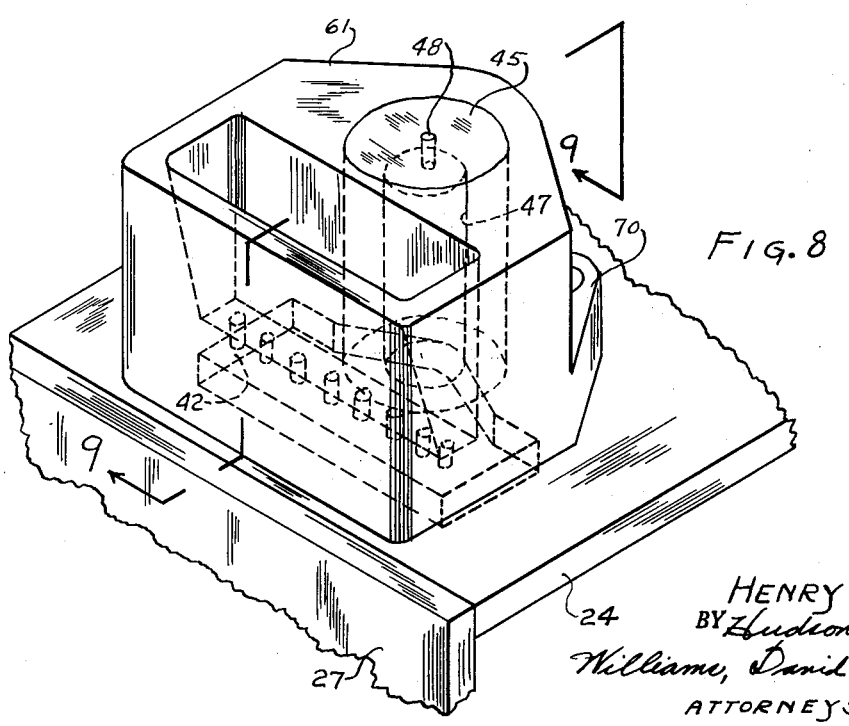
Fig. 8 is a view similar to Fig. 7 but showing a gate associated with the mold cavity.

The gates 61, 62 are rotated by a generally T-shape lever 66 which is pivoted to the plate 24 at 67. The gates 61, 62 have lugs 70, 71 formed on the respective sides facing one another and the lever 66 is connected to the respective lugs by links 72, 73 which are connected to the ends of the arms of the lever. As may be seen in Fig. 3, when the lever 66 is rotated in either direction from the position shown the gates are rotated in one direction or the other and considerable leverage in rotating the gates is afforded by the lever 66.

In the form of the invention shown battery plates and separators are assembled in the form of a battery element and clamped in a rack 76 and inserted beneath plate 24 with the plate lugs of the positive and negative plates in registration with the openings 42, 43, respectively. The rack 76 comprises a plate 77 having a longitudinally extending groove 78 in the upper surface and an upright end plate 80 is supported at one end thereof by two abutments 81, 82. The abutments 81, 82 are reinforced by a rod 83 interconnecting the abutments and welded thereto. A slide plate 84 slidingly fits in the groove 78 of the plate 77 and a presser plate 85 is supported upright on the plate 84 by two abutments 86, 87 which are braced by a rod 88 extending therebetween and welded thereto. The plate 84 has a slot 89 therein and the plate 77 has an opening 90 therethrough, through which opening and slot a bolt 91 extends and receives a knurled nut 92 thereon to frictionally clamp plate 84 to plate 77 and thereby adjustably position the backing member along plate 77. Preferably, the underside of plate 77 is undercut about the opening 90 to accommodate the head of the bolt 91.

Figure 4:
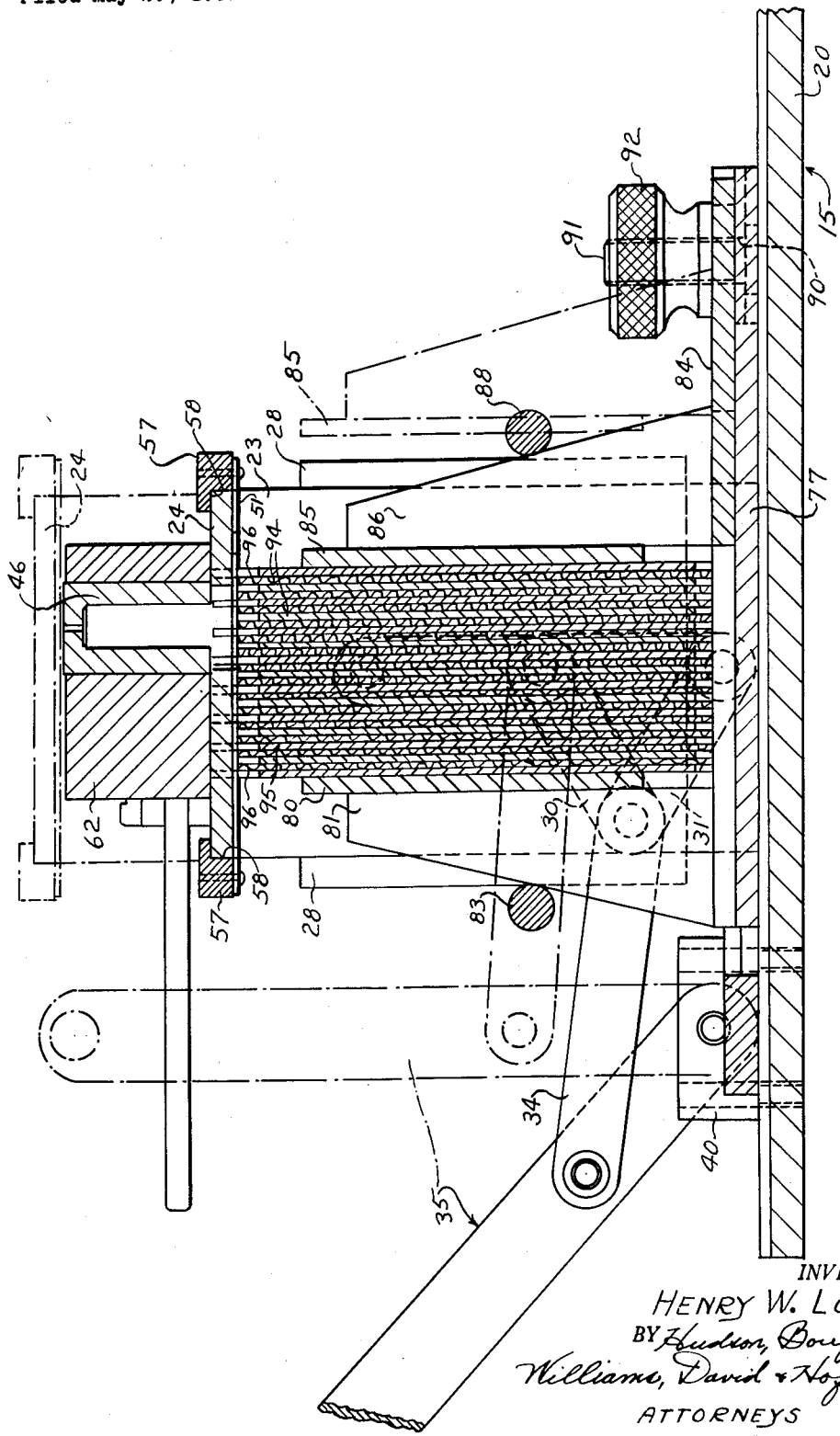
Fig. 4 is a sectional view taken substantially on line 4—4 of Fig. 2 but on a larger scale.

As may be seen by reference to Fig. 4, battery elements comprising positive plates 94, negative plates 95 and separators 96 can be placed on plate 77 and clamped between the plates 80, 85 of the rack 76 and the rack then slid into the apparatus 15 beneath plate 24 to register the plate lugs with the mold openings 42, 43. To facilitate lateral alignment of the plate lugs with the mold openings 42, 43, guide plates 97, 98 are attached to the insides of the side plates 22, 23, respectively, and have beveled edges which cam the plates and rack into proper position as the rack is slid into place in the event the rack is to one side or the other of its proper position. Longitudinal alignment of the plate lugs with the mold cavities 42, 43 is provided by a stop block 100 against which the rack 76 engages and which is adjustably clamped to the plate 20 by bolts 99 which extend through slots 102 in the block and are threaded in openings in the plate 20.

Preferably, the plate 20 has a shallow channel 104 formed therein to reduce the area thereof engaged by the plate 77 of rack 76, thereby minimizing the sliding friction between the rack and plate.

It will be apparent that to cast connecting straps to the assembled plates in the rack 76 the lever 35 is moved to elevate plate 24 and the comb handles 56, 57 are moved inwardly. Rack 76 is then positioned beneath plate 24 as described and lever 35 is then moved to lower plate 24 so that the battery plate lugs project into the respective mold openings 42, 43. The comb handles 56, 57 are then drawn outwardly which move the combs 50, 51 into place to close the bottoms of the mold openings 42, 43. Preferably, the gates 61, 62 and plate 24 about the openings 42, 43 therein are heated by suitable means, such as gas flames, to the melting point of lead or thereabout and molten lead is then poured into the troughs 64 of the gates until the post cavities are filled. It wil be seen that the depth of the troughs 64 is greater than the height of the post cavities so that the static head of the metal assures filling of the post cavity. Furthermore, since the molten lead enters the bottoms of the post cavities, the air is driven out through vents 48 and a solid terminal post is thus formed. The molten metal flowing about the plate lugs melts at least a portion of the lugs and causes fusion of the metal of the plates with that of the connecting straps so that a sound, homogeneous foot section of the strap is formed. The gates and plate are then preferably cooled by cool air blasts and after the metal is solidified, lever 66 is actuated to rotate the gates 61, 62 which shears the metal in the sprues 65 from the feet of the connecting straps. Lever 35 is then moved to the vertical position to raise plate 24 above the battery element which may then be withdrawn from the apparatus by removing the rack 76. The slugs remaining in the trough 64 may be removed by suitable knockout means, not shown, and returned to the melting pot.

It will be seen that the objects enumerated have been attained, as well as other, and that a method and apparatus has been provided for quickly and economically casting connecting straps to storage battery elements. The battery plates and separators can be assembled in the form of an element and the connecting straps cast thereon with the separators in their positions of ultimate use so that element is substantially complete and finished after the straps are cast. In the form of apparatus shown, the connecting straps for only one element are cast at one time, but it will be apparent that the straps for any desired number of elements may be cast simultaneously by increasing the size of the apparatus and the number of mold openings, combs, etc. By introducing the molten metal into the foot section of the strap cavity the hot metal fuses the plate lugs to form a homogeneous foot with the battery plates and the flow of metal into the post cavity at the bottom thereof assures a sound casting throughout. While the preferred embodiment of the invention has been described in considerable detail, I do not wish to be limited to the particular construction or methods shown and described which may be varied within the scope of this invention. It is my intention to cover hereby all adaptations, modification and uses thereof which come within the practice of those skilled in the art to which the invention relates.

Having thus described my invention, I claim:

1. Apparatus for casting battery plate connecting straps comprising, a mold structure having a foot cavity therein for forming the foot portion of a connecting strap and having an open bottom to receive vertically projecting lugs of grouped battery plates below said cavity, means for supporting a group of battery plates below said mold structure with their lugs projecting vertically into said foot cavity, said mold structure including a vertically extending cylindrical projection having a post cavity therein communicating with said foot cavity and extending upwardly therefrom to form a mold for the terminal post of said connecting strap, means to close the bottom of said foot cavity with the lugs of the battery plates projecting upwardly into said foot cavity, and a movable gate for said mold structure having a trough therein to receive molten metal the walls of which trough extend to an elevation above the level of said terminal post cavity, said gate having a passage therein extending from the bottom of said trough to the upper portion of said foot cavity, and means for supporting said gate for rotation about said cylindrical projection of said mold structure for shearing solidified metal in said gate from the metal in said foot cavity.

2. Apparatus for casting battery plate connecting straps comprising a frame, means to support a group of battery plates on said frame, a horizontal plate supported on said frame above said means, said plate having an opening therethrough, the walls of which opening comprise a cavity for the foot portion of a connecting strap, said cavity being open at the bottom to receive lugs of battery plates supported by said means, a cylindrical member projecting vertically from said plate and having a portion overlying said opening, said portion having a cavity therein opening into the first-mentioned cavity and projecting upwardly to form a mold for the terminal post of the connecting strap, and a gate for said mold structure, said gate being pivotally supported by said cylindrical member and substantially closing the top of said opening in said plate and including a trough to receive molten metal and having a relatively small opening in the bottom of the trough to form a passageway into the first-mentioned opening of said mold structure, said gate being swingable in a horizontal plane to shear solidified metal extending from said relatively small opening in the bottom of said trough into the first-mentioned opening, movable comb means enclosing the bottom of the first mentioned cavity, and means to raise and lower said plate.

References Cited in the file of this patent

UNITED STATES PATENTS

| | | |
|---|---|---|
| 1,235,779 | Engel | Aug. 7, 1917 |
| 1,344,294 | Disinger | June 22, 1920 |
| 1,438,637 | Daily | Dec. 12, 1922 |
| 1,545,051 | Hazelett | July 7, 1925 |
| 1,562,032 | Lohman | Nov. 17, 1925 |
| 1,663,050 | Johnson | Mar. 20, 1928 |
| 1,701,721 | Lewin | Feb. 12, 1929 |
| 1,776,327 | Sentkowski et al. | Sept. 23, 1930 |
| 1,912,606 | Watson | June 6, 1933 |
| 1,948,120 | Lormor | Feb. 20, 1934 |
| 2,103,531 | Holhut et al. | Dec. 28, 1937 |
| 2,520,263 | Vinal | Aug. 29, 1950 |